June 14, 1932.   W. T. LIVERMORE   1,862,598
REELING DEVICE
Filed July 16, 1930

INVENTOR
W. T. Livermore
BY
ATTORNEY

Patented June 14, 1932

1,862,598

UNITED STATES PATENT OFFICE

WILLIAM T. LIVERMORE, OF WESTFIELD, NEW JERSEY, ASSIGNOR TO AMERICAN TELEPHONE AND TELEGRAPH COMPANY, A CORPORATION OF NEW YORK

REELING DEVICE

Application filed July 16, 1930. Serial No. 468,401.

This invention relates to reeling devices, and, more particularly, to power reeling devices of the collapsible type.

An object of the invention consists in the provision of a reel which is adapted to be attached to or removed from a power shaft in a simple and expeditious manner.

Another object consists in providing such reel with collapsible mechanism by which a coil of wire, or like material, may be bodily removed or placed in position on said reel.

A further object consists in the provision of a reel of a compact and rugged structure, which is reliable and comparatively inexpensive to manufacture.

These and further objects will be apparent from the following description, when considered in connection with the accompanying drawing, in which one modification of the invention is illustrated.

Figure 1:
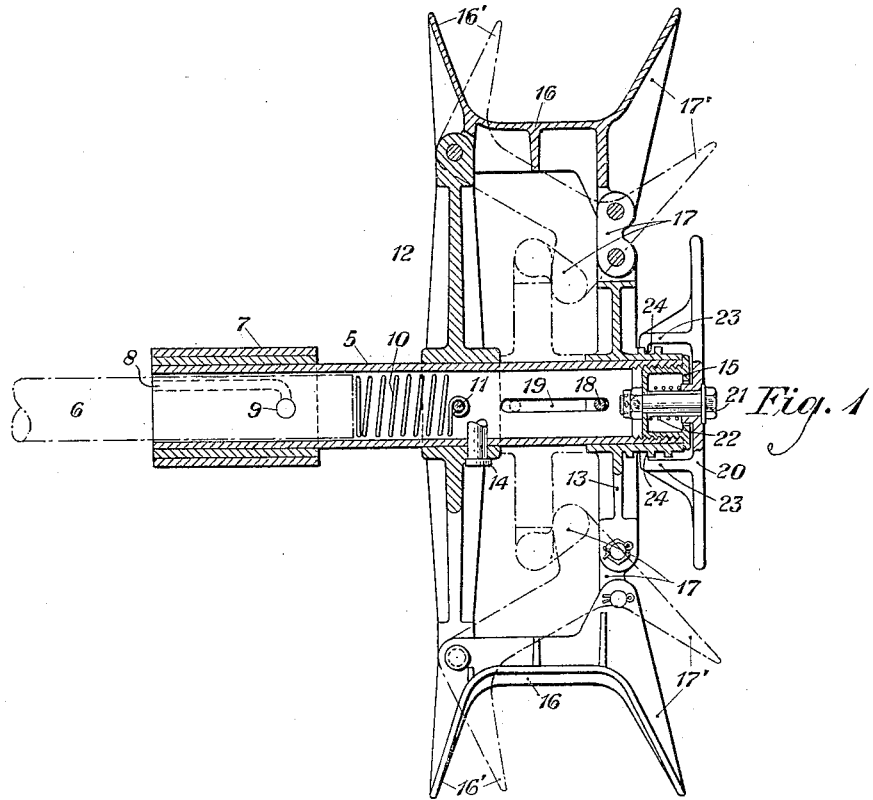
Figure 2:
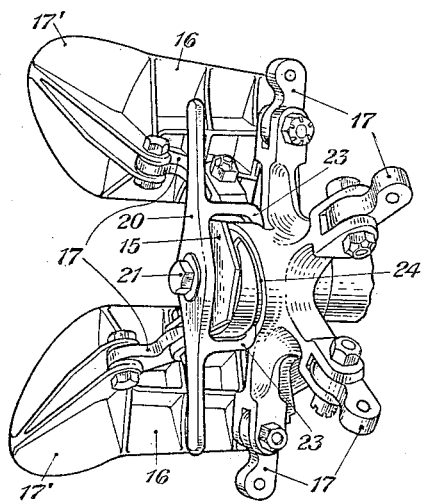

Referring to the drawing, Figure 1 is an elevation in section of the improved reel, shown as applied to the end of a winch shaft, and having its operating position indicated by full lines and its collapsed position by dotted lines, and Fig. 2 is an enlarged detail in perspective, showing the outer or sliding spider of the reel with its associated locking mechanism.

The reel is provided with a central shaft 5 which may be made of seamless steel tubing, and said shaft is shown as applied to the end of a power shaft 6. The diameter of the left end of the reel shaft 5 may be enlarged by the provision of outer concentric sections 7 of seamless tubing. These sections may be welded or otherwise affixed to the end of the shaft 5. This form of reenforcement may be made to the ends of the shaft 5 in order to provide two longitudinal slots 8 which are diametrically opposed to each other. The slots serve to engage the ends of a fixed pin 9 which extends through the shaft. The slots 8 have a right angle bend at one end, and are also provided with a cutaway portion to form a seat for the pin 9. A spring 10 provided in the shaft 5 is under compression and forces the power shaft pin 9 into the cutaway portion. One end of the spring 10 is secured by a pin 11 which extends through the reel shaft 5.

The reel is mounted on the outer end of the shaft 5 and is provided with an inner or fixed spider 12 and an outer or sliding spider 13. The spiders are each provided with a plurality of circumferentially spaced arms which radiate from a central hub. The arms on one spider are parallel to the arms on the companion spider. The arms of the inner spider 12 are of greater length than the arms of its companion outer member 13. The extremities of the arms of the member 13 are bifurcated, as will be presently referred to. The inner spider 12 is affixed to the reel shaft 5 by a pin 14. The outer spider 13 is adapted to move longitudinally on the end of the shaft, its range of movement being between the inner end of the hub of spider 12 and the stop plate 15. This stop plate 15 may be in the form of a nut which is provided with an extended casing screwed into the end of the reel shaft. The spider 13 is prevented from rotating on the shaft 5 by means of a pin 18 which extends through its hub. This pin 18 slides in a slot 19, positioned longitudinally on the shaft, in accordance with the movement of the spider 13.

Plates or wire supports 16 substantially in the shape of arcuate segments form a sectional rim and these connect each pair of parallel arms on the spiders 12 and 13. These plates or supports are provided at each end with perforated flanges, and the inner flanges are pivotally connected with the ends of their associated arms on the spider 12. The inner plates or supports are also provided with reel arms 16'. The other or outer flanges of the plates or supports are pivotally connected to one end of links 17, while the other ends of the links are pivotally connected with the bifurcated ends of the outer or movable spider 13. The reel arms 16' and 17' are each integral with the sectional rims 16. These arms extend outwardly from the sectional rims and serve to confine the wire between them as it is wound on said rims. The pivotal or link connections of the movable spider 13 and the sectional rims 16 form toggles which, when collapsed or broken, assume the positions shown by dotted lines in Fig. 1. This collapse permits the coil of wire or rope which may be wound on the reel to be bodily and readily removed.

The pivoted arrangement of the sectional rims and their wire retaining reel arms with the movable spider differs from the usual practice in which the sectional rim has been made integral with the spiders. These structures cause sidewise pressure between the arms of the fixed spider and toggle arms of the movable spider and have resulted in breakage of the locking means for the spiders and also breakage of the arms of the spiders. The present arrangement places no bending strain upon the arms or any of the movable locking elements. The stresses produced by the tendency of the coil of wire to increase in width due to the wedging action of the wire as it is wound upon the sectional rims are not transmitted to any of the other parts of the reel. This permits the other parts of the reel to be made of lighter material, and the reel may be also used for heavier service.

The reel may be provided with any suitable number of arms extending radially from a central hub or shaft. These arms cooperate with each other to form a wire support whose arcuate segments or bases form a sectional rim. The segments are curved on a radius equal to the curvature of the coil, and so proportioned to provide sufficient bearing surface so that a coil of practically circular nature may be formed thereon.

A control member in the form of a handle 20 is positioned on the outer end of the shaft 5. This handle which provides locking means, as will be presently described, is rotatably mounted on a bolt 21. The bolt is secured to a casing threaded into the end of the shaft 5, and the stop plate 15 forms an outer cover for such casing. A spiral spring 22 is positioned on the bolt 21 within the casing and provides compression to frictionally engage the end of the handle, which extends through the plate 15 into the casing, to prevent said handle from turning under vibration. The handle 20 is provided with projecting extensions which terminate in fingers 23, which are oppositely positioned with respect to each other. The fingers 23 have ends which are turned inwardly toward each other and engage helical grooves 24, 24, as more clearly indicated in Fig. 2. The two helical grooves 24, 24 each extend only half the distance about the hub, and are positioned approximately 180° apart with respect to each other thereon. The grooves are open at the end of the hub to permit a greater longitudinal movement of the movable spider than the incline of the grooves would otherwise permit.

When the reel is in an operating or extended position, a left hand or counter clockwise rotation of the handle 20 causes its fingers 23, 23 to bear against the respective inner sides of the grooves 24, 24. This action forces the sliding spider inwardly on the reel shaft, and breaks the previously mentioned toggle. This movement of the handle 20 causes the movable spider 13 to travel about half its range of movement. The remainder of travel of the spider is caused by the weight of the wire on the reel, or by a slight pressure by the operator on the movable spider to cause its extreme collapse.

In extending the reel from its collapsed position, the operator pulls the movable spider outwardly until the two fingers 23, 23 of the handle 20 enters the grooves 24, 24. A clockwise or right-handed rotation of the handle 20 draws the movable spider 13 to its extreme outward position so that the above mentioned toggle is reestablished. When the reel is in its operating position the ends of the fingers 23, 23 rest against the outer side of the grooves 24, 24 and lock the movable spider in position. In this position, the links lie in a plane at right angles to the shaft so that any stress set up by the wire in the reel will not cause the sliding spider to move inwardly and rotate the control handle 20.

What is claimed is:

A reel comprising a fixed spider and a movable spider, each having parallel arms extending from a central hub, a shaft to which one of said hubs is fixed, the other hub being slidable upon said shaft, sectional rim members, each sectional rim member forming a segment and having one end pivoted to an arm of the spider with the fixed hub, each rim member having fixed projecting arms extending at an angle thereto and forming a retaining member at each side of the reel, a single toggle link extending from each arm of the spider with the movable hub and directly pivoted to the opposite end of the corresponding rim member, and locking means associated with movable spider to fix it upon said shaft so as to prevent collapse of said reel.

In testimony whereof, I have signed my name to this specification this 14th day of July, 1930.

WILLIAM T. LIVERMORE.